(12) United States Patent
Arsenich

(10) Patent No.: US 9,817,162 B2
(45) Date of Patent: Nov. 14, 2017

(54) STEREOPROJECTION SYSTEM

(76) Inventor: Svyatoslav Ivanovich Arsenich, Reutov (RU)

( * ) Notice: Subject to any disclaimer, the term of this patent is extended or adjusted under 35 U.S.C. 154(b) by 0 days.

(21) Appl. No.: 12/298,170

(22) PCT Filed: Apr. 25, 2006

(86) PCT No.: PCT/RU2006/000203
§ 371 (c)(1),
(2), (4) Date: Oct. 23, 2008

(87) PCT Pub. No.: WO2006/118483
PCT Pub. Date: Nov. 9, 2006

(65) Prior Publication Data
US 2009/0102915 A1    Apr. 23, 2009

(30) Foreign Application Priority Data

Apr. 25, 2005    (RU) .................................. 2005112314

(51) Int. Cl.
*H04N 9/47* (2006.01)
*G02B 5/10* (2006.01)
(Continued)

(52) U.S. Cl.
CPC ........... *G02B 5/10* (2013.01); *G02B 27/0093* (2013.01); *G02B 27/0172* (2013.01);
(Continued)

(58) Field of Classification Search
CPC ........ G02B 2027/0134; G02B 27/0093; H04N 13/0468
(Continued)

(56) References Cited

U.S. PATENT DOCUMENTS 6,163,336 A * 12/2000 Richards .......................... 348/42
6,593,957 B1 * 7/2003 Christie ............................ 348/42
(Continued)

FOREIGN PATENT DOCUMENTS

RU    2221350 C2    1/2004

*Primary Examiner* — June Sison
*Assistant Examiner* — Adam Cooney
(74) *Attorney, Agent, or Firm* — Matthew A. Pequignot; Pequignot + Myers LLC

(57) ABSTRACT

The invention relates to stereo projection systems for displaying stereopaired images on mirror-spherical or parabolic screens and for collectively watching a stereo effect without using stereo spectacles. Said invention makes it possible to continuously dynamically superimpose the projections of the left and right picture frames of a steropair with the user's left and right eyes, respectively. Such impositions are carried out simultaneously and independently for each viewer. The technical result is attainable by that the inventive stereo projection system comprises stereo projectors which are individually allocated to each viewer and in-series connected, a monitoring system for continuously and accurately determining the viewers' eye positions, a self correcting device, video-correcting devices, automatic drives for the mechanical self-correction of the stereo projectors and the system optical elements, units which are used for forming stereopair projected images in the stereo projector and which are coupled with the video-correcting device for the video-correction of the optimal parameters of the screen images. The inventive system makes it possible to carry out the self- and video-correction in an integral manner in such a way that the comfort of the stereo effect viewing is maximally satisfied.

5 Claims, 3 Drawing Sheets

(51) Int. Cl.
*G02B 27/00* (2006.01)
*G02B 27/01* (2006.01)
*G02B 27/22* (2006.01)
*G03B 21/28* (2006.01)
*G03B 35/18* (2006.01)
*G03B 35/24* (2006.01)
*H04N 13/04* (2006.01)

(52) U.S. Cl.
CPC ......... *G02B 27/2235* (2013.01); *G03B 21/28* (2013.01); *G03B 35/18* (2013.01); *G03B 35/24* (2013.01); *H04N 13/0427* (2013.01); *H04N 13/0459* (2013.01); *H04N 13/0468* (2013.01); *H04N 13/0497* (2013.01); *G02B 2027/0134* (2013.01); *G02B 2027/0138* (2013.01)

(58) Field of Classification Search
USPC .......................................... 348/53
See application file for complete search history.

(56) References Cited

U.S. PATENT DOCUMENTS

| | | | |
|---|---|---|---|
| 7,224,526 B2 * | 5/2007 | Putilin et al. ................. | 359/462 |
| 2002/0075384 A1 * | 6/2002 | Harman ........................... | 348/43 |
| 2003/0020879 A1 * | 1/2003 | Sonehara .......................... | 353/7 |
| 2007/0097319 A1 * | 5/2007 | McKay et al. .................... | 353/7 |

* cited by examiner

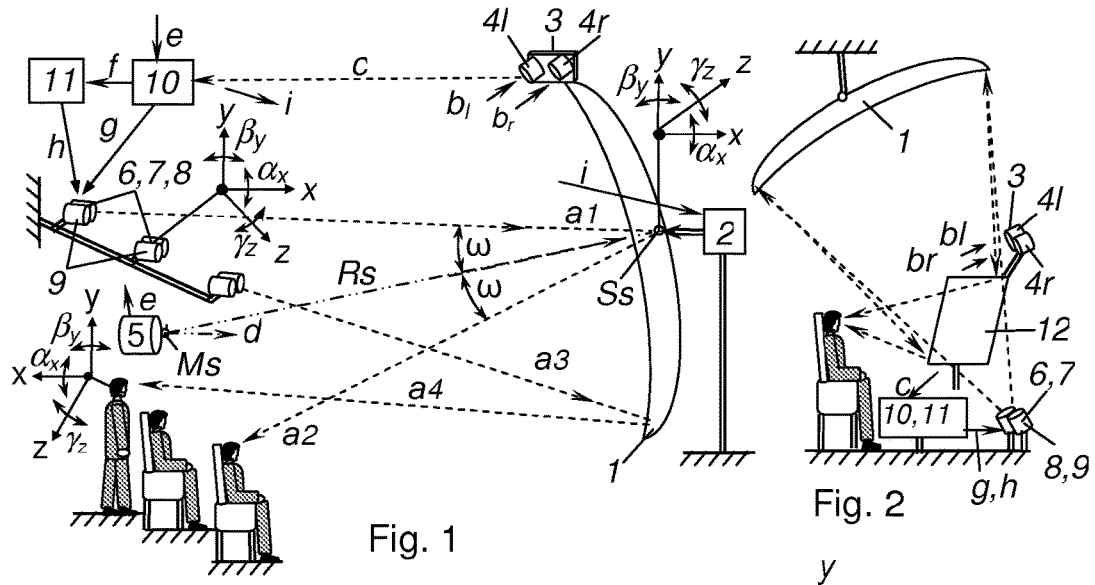
Fig. 1
Fig. 2
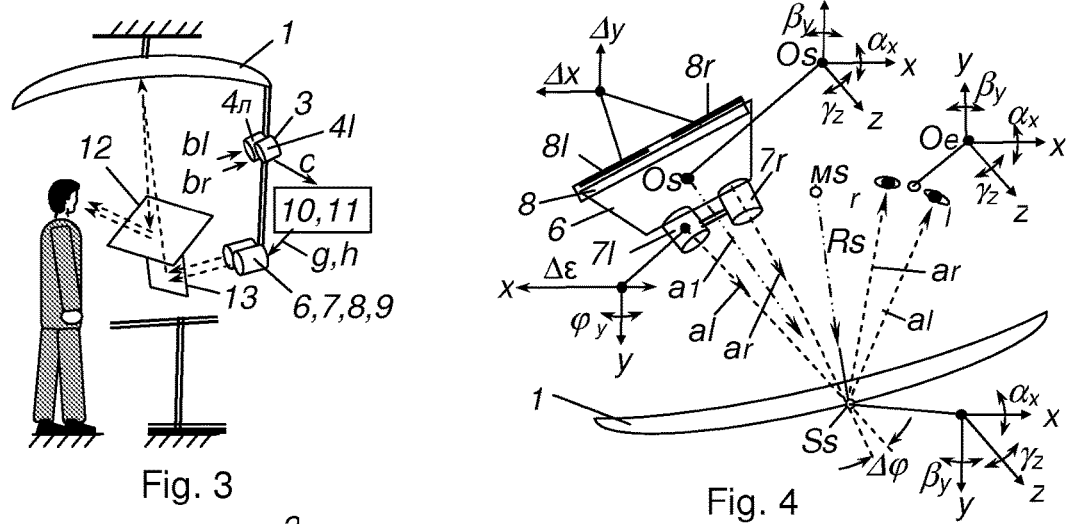
Fig. 3
Fig. 4
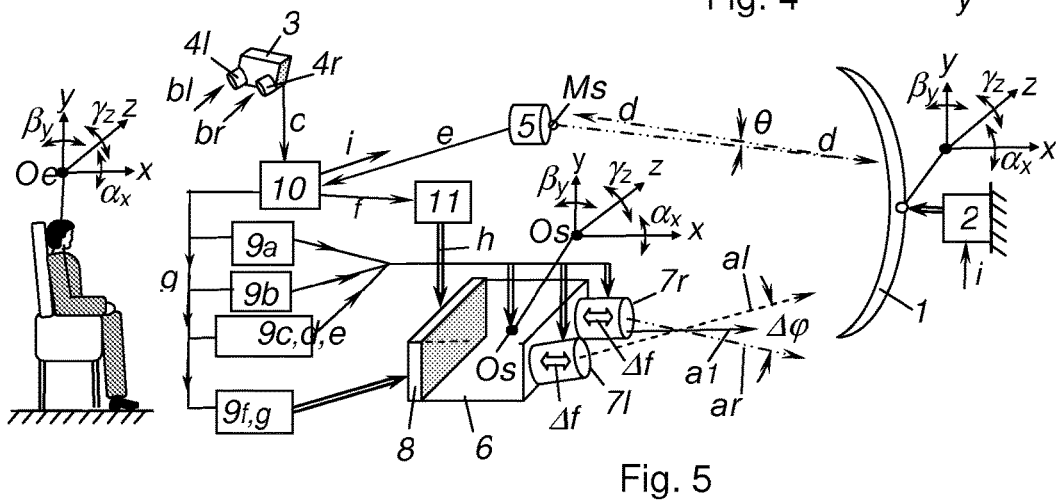
Fig. 5

STEREOPROJECTION SYSTEM

CROSS-REFERENCE TO RELATED APPLICATION

This national stage 371 application claims the priority of International Application No. PCT/RU2006/000203, filed Apr. 25, 2006, designating the United States, incorporated herein in its entirety by reference.

TECHNICAL FIELD

The present invention relates to stereoscopic projection systems intended for presentation of three-dimensional visual information by way of projection of the stereopair images onto reflecting spherical, elliptical or parabolic screens for individual or collective viewing of stereoscopic effect without stereo glasses. The invention is intended mainly for mass scale use in stereoscopic systems of the cinema, television, computers and video training. In addition the invention can be widely used for visual communication and video training simulators, electronic computer games and game-playing machines, in medicine, science, engineering, arts, for visual advertising, in industry and in other fields.

BACKGROUND ART

The known countertypes of the stereoscopic projection systems (golographic, raster, with stereoscopic glasses, retroreflective and others) with the exception of the system of projection on reflecting spherical stereoscreens are discomfort and unfit for long viewing of stereoimages.

The common drawback of these countertypes is a technical problem of auto-correction and video correction of the stereoscopic system individually for each viewer.

The most close prototype both for design and reached effect is the system of stereo projection onto the reflecting spherical stereoscreen described in the invention "A Stereoscopic System" by S. I. Arsenich (RF patent No 2221350 published in October 2004). A stereoscopic projection system comprises a reflecting spherical stereoscreen, individual stereoprojectors for each viewer (for projection of stereopair images) with automatic drivers for displacement of stereoscopic lenses parallel to the stereoscreen, sensor (video camera) for independent definition of three dimensional coordinates of each viewer's eyes position in relation to the common stereoscreen and his own stereoprojector. The system incorporates an auto-corrector connected to the sensor and automatic drives of the stereoscopic lenses. The sensor generates control signal sent to the auto-corrector for the auto-corrector to execute the signal of automatic drive control. The automatic drives automatically continuously dynamically displace the stereoscopic lenses and orientate them in parallel to the stereoscreen for constant matching of the stereo vision focal zones of the stereopair left and right screen images with the viewers' left and right eyes respectively.

The prototype provides for visual comfort of stereo viewing (smaller eye strain and experimentally demonstrated real depth of stereo effect up to 1 km and more when a viewer is placed at a distance of 3 m to the stereoscreen) owing to equalization of the viewer's accommodation efforts and convergence state of the eyes. provides for partial improvement of physical comfort with a possibility for the viewer to move and incline his head in the space of the stereo vision zone (due to the displacement of the projection lenses of the stereoprojectors).

The prototype's disadvantage is small and limited improvement of the stereoscopic comfort. This is conditioned by constructive limits of the stereoscopic lens displacement only in parallel to the stereoscreen which allows small range of the viewer's head displacements along the radius of the stereoscreen of about 100-200 mm (in the limits of the length of the focal zones of the stereo vision ensuring the viewing of full-screen stereoimage). Field of the screen stereoimage vision is limited by small space of the focal zone of viewing of the full-screen stereoimage which limits number and depth of the stereo effect planes proportional to the angle of the field of vision. Different curvature of the left and right frames of the stereopair images increases feeling of stereoscopic discomfort, strain and weariness of the eyes because this increases visible divarication of the conjugate points (any two points of the stereopair left and right frames observed as a single point of the stereoimage) as the eyes focal point moves to the stereoscreen border. Furthermore, harmonization of accommodation (ocular focusing) and eyes convergence (slant of the ocular vision axes) don't correspond to the natural binocular viewing of real objects.

The prototype disadvantages result from the fact that only auto-corrector and automatic drives are used for auto-correction of displacement of the stereoscopic projection lenses relative to the stereoscreen. There aren't provided systems of the viewer's ocular convergence monitoring, systems of video correction of the stereoscreen sphericity and geometrical distortions of the projected frames neither a system of wide-frame stereoscopic projection for provision of prolonged full comfort viewing due to visual dynamic convergence of conjugate points in synchronism with changes of the viewers' ocular convergence and ocular focal point.

DISCLOSURE OF INVENTION

The principal object of the invention is to provide full comfort stereoscopic projection systems for individual and collective stereoscopic viewing without conventional stereoscopic glasses. Another object of the invention is to create a full comfort projection system with stereoscopic glasses allowing free eye accommodation without auxiliary optical stereoscopic systems on the stereoscreens located close to the eyes and in projection reflecting spherical stereoscopic glasses (stereoscreens). Full comfort of stereoscopic vision is a combination of physical, physiological and visual comfort of a viewer without limitation of stereoscopic viewing time in conditions of external flare light on the stereoscreen. Physical comfort envisages free movement of the viewer in a spacious viewing zone, inclination and turn of the viewer's head and body, movement of the eyes and pupils (convergence of the visual axes to the ocular focal point). Physiological comfort causes psychomotor reactions: feeling of visual depth and presence effect—perception of movements and real spatial depth of the objects' images by a viewer. At the same time irritation and weariness of eyes and brains causing psychical disorders are avoided. Visual comfort—provision of stereoviewing of the screen stereoimages of standard quality (with high brightness of up to 3000 cd/m$^2$ and high contrast of about 1000 units in conditions of direct solar illumination, with high resolution and clearness without geometrical distortions), with feeling of high depth of stereo effect, approaching binocular observing of the real objects. The stereoimage shall be wide-framed with horizontal angle of field of vision of 70° and vertical angle of field of vision of 50°; this increases depth of stereo effect and reduces the pushing border effect when the screen border cuts a part of the image.

The principal technical effect achieved by implementation of the invention is a provision of optimal selective or comprehensive auto-correction of the projected stereopair frames owing to design features of the stereoscopic projection system. This will ensure full comfort stereo viewing for various embodiments and working conditions of the claimed stereoscopic projection systems and new revolutionary parameters. The auto-correctors and video correctors ensure auto-correction of the stereobase of optical elements of the stereoprojectors as well as video correction of the stereoframes for variations of the ocular stereobase, distance to the stereoscreen, inclination and turn of the viewer's head, changes of the ocular convergence angle or ocular focal point. A simultaneous viewing of different full-screen images by different viewers on the common stereoscreen is provided with clear and comfort stereo vision without glasses for short-sighted or long sighted viewers and viewers with other eyesight defects. These features are essential for the mass scale and prolonged viewing of stereoscopic information: television, computer, videoplaying and training stereoprograms, stereomonitoring of microassembling, juweller's work, surgical operations and video diagnostics, processus supervision in scientific researches, remote and "blind" navigation and control of flying, space and submarine machines, as well as for the use in many other fields.

The said technical effect is achieved due to the stereoscopic projection system is intended for glasses free viewing of horizontal stereopair images on the stereoscreen (without conventional stereoscopic glasses: ecliptic, polarizing, anaglyphic, oculars). The stereoscopic projection system comprises a reflecting-focusing stereoscreen, for example, spherical, elliptic, parabolic or raster reflecting screen. One or several stereoprojectors, one for each viewer, are located in front of the stereoscreen or on the stereoscreen (with a flat reflecting mirror being positioned in front of the screen).

Set of essential features of the claimed system consists in the fact that the system incorporates the tracking system for tracking position data of each viewer's eyes and/or pupils and/or face elements. For example, two video cameras for video recording of the viewers' faces serve as sensors for the tracking system. The tracking system includes an electronic processor for processing control signals for correction of the optical stereoscopic projection system. On a basis of the face elements the tracking system indirectly identifies coordinates of the viewer's eyes when they are unseen for the video cameras.

Technical effect—ensuring of continuous tracking of the eyes or pupils position data for precise auto-correction and video correction of the stereoscopic system both for open and closed eyes (during blinking and viewing in dioptricalal and sun glasses).

The stereoprojector or stereoprojectors (for collective viewing on the common screen) are fast suspended on the common stereoscreen or on a support in front of the stereoscreen (in reflecting spherical head displays) or stereoscopic systems with stereoscreen placed close to the viewers' eyes. In another embodiment the stereoprojects are fast suspended on the auto-drives with mechanical auto-correctors. The auto-correctors are connected with tracking system and intended for dynamical automatical displacement of these stereo projectors along any coordination axes of the three-dimensional space and/or rotation of these stereoprojectors around these coordinate axes by means of auto-drives. The stereoprojectors incorporate auto-drives with auto-correctors for displacement of optical systems of projection magnification or projection lenses along any coordinate axes or rotation around these axes. In yet another embodiment the auto-drives of optical systems of projection magnification are intended for auto-focusing and/or auto-aperture and/or auto-correction of the stereobase width between the optical axes of stereoprojection and/or orientation of these axes into the stereoscreen center and the viewers' ocular focal points.

Technical effect—provision of auto-correction of the optical systems of stereoprojection magnification, in particular, auto-correction of projection lenses of the stereoscopic lens assemblies which ensures dynamical optical positioning of the optical systems when the viewer moves relative to the stereoscreen.

In yet another embodiment the stereoprojectors comprise movable matrices or movable projecting units for forming and primal orientation of the projected stereopair frames relative to the projection lenses. These units or matrices are provided with auto-drives with auto-correctors for displacement of these matrices along their horizontal and vertical axes and/or rotation of these matrices around the vertical axis or displacement of the projection units (with the reflective screens being located inside the stereoprojector) around their vertical axes and/or auto-focusing of these projection units inside the stereoprojector. In yet another embodiment the stereoscopic system comprises an electronic-optical video corrector for correction of the stereobase, scale and geometrical parameters of the projected stereopair frames inside the stereoprojector. The video corrector is connected with auto-corrector and/or the unit forming projected stereopair frames inside the stereoprojector and/or with the tracking system.

Technical effect—a possibility of automatic horizontal mechanical correction (by means of the auto-corrector) or electronic correction (by means of video corrector) of displacement of the stereopair frame centers inside the stereoprojector for optimization of stereobase of the projected stereopair as well as for elimination of vertical parallaxes and visible geometrical (spherical, scale and perspective) distortions on the stereoscreen in case of viewing of projections at different angles. This provides for exact convergence of the conjugate points on the entire screen surface, optimal harmonization of horizontal parallaxes with regard to individual ocular stereobases, convergence angles and ocular focal points for each viewer.

In yet another embodiment the stereoscreen is made as a single element or consists of assembled sections. This screen or its sections are fast mounted (with the stereoscreen being located close to the viewers' eyes). A large stereoscreen or its sections (with the stereoscreen being located far from the viewers' eyes) are mounted fast on their auto-drives connected with the auto-corrector for displacement of this screen or its sections by means of these auto-drives along any coordinate axes and/or rotation around these coordinate axes. Automatic monitoring of orientation and sphericity of the screen and its sections and their auto-correction relative to the viewers and stereoprojectors is ensured by an auto-collimator placed in front of the stereoscreen (for optical scanning of reference elements of the screen or its sections). The auto-collimator is intended for definition of actual position of the screen mirror centers and execution of the control signals sent to the auto-corrector. The screen auto-drives ensure automatic dynamic or static convergence of the mirror sphere center of this screen into the programmed screen center or convergence of all the mirror sphere centers of all the sections into a single programmed center.

Technical effect—automatic positioning of the stereoscreen during its installing or operating. Compensation of the screen non-sphericity and/or displacements of the stereoscreen sphere center in case of its deformation or displacement of the screen sphere center or mirror spheres of the screen sections. A technical possibility of high-precision positioning of sphericity of the large screens consisting of precise small-diameter sections for increasing of the viewers' number.

The auto-correctors and video correctors comprise programmed processor for execution of the control signals sent to the video corrector and auto-drives of the stereoscopic projection system with a possibility of selective or comprehensive dynamic auto-correction and video correction of optical elements of the stereoscopic projection system in order to ensure full comfort stereo vision.

The common technical effect—a possibility of dynamic continuous adjustment and auto-positioning of the stereoscopic projection system in general and its optical elements for continuous alignment of the focal zones of stereo vision, individual for each viewer, with the viewers' eyes. Forming of geometrically correct projection parameters is ensured for continuous and precise harmonization of the ocular convergence angles and accommodation. This allows free movement of the viewers in a spacious zone of stereo vision, inclination and turn of their heads, change of the ocular stereobase and focal points, as well as changes of angle of stereo image observing. Individual programmed auto-focusing of each projection lens ensures clear stereo vision for the viewers with eyesight defects without dioptricalal glasses.

Alternative choice of essential features ensures optimal operation of the stereoscopic systems of various design in various individual working conditions offering optimal stereo comfort, for example:

1. The head mounted stereodisplays—reflecting spherical glasses doesn't require auto-correction as alignment of centers of the projection focusing points and centers of movable pupils of the eyes is achieved by a single-shot positioning of stereobase of the movable lens and dynamic video correction of the stereobase and preliminary geometrical distortions of the stereopair frames. Video correction of the projection video apertures and micromirrors when spherical mirror of the stereoscopic glasses is fixed fast relative to the eyes.

2. A stereoscopic projection system with auto-corrector and auto-drives for displacement of the stereoprojectors is optimal only for the stereoscreens with small field of vision of up to 15° and the viewer's position close to the center of the stereoscreen sphere. Because of small angle of the field of vision video correction isn't necessary but stereo effect is reduced and pushing border effect is observed. This reduces visual comfort (depth of stereo effect) and stereo viewing time is limited by three hours because of weariness of the viewer's eyes (resulted from visible spherical distortions).

3. A stereoscopic projection system with system of monitoring of the viewer's eyes and position of the sphere center of the of the movable stereoscreen, moving and rotating in synchronism with the viewer's movements and placed close to the viewer's eyes at a distance of about 20-1000 mm. The system comprises only an auto-corrector of displacement and rotation of this stereoscreen for precise dynamic positioning relative to the viewer's eyes. Fast fixing of the stereoprojectors to the stereoscreen eliminates a necessity of the auto-corrector and stereoprojector auto-drives. Only video correctors for video correction of spherical, geometric, dynamic preliminary distortions and video correction of displacement of the point video apertures or micromirrors (instead of projection lenses) for dynamic alignment of the projection focusing centers into the viewers' pupils of the eyes at convergence.

4. A stereoscopic projection system for collective viewing on large reflecting spherical stereoscreens (for 50-1000 viewers and more) and on the stereoscreens consisting of assembled reflecting spherical sections. The stereoscreen sections must be converged into the common sphere center of the entire stereoscreen by means of auto-collimator for optical scanning and monitoring of the stereoscreen sphericity and auto-drives of the stereoscreen sections or the entire stereoscreen connected with the auto-collimator for auto-correction of sphericity and orientation of these sections or the entire stereoscreen.

5. Stereoscopic projection for numerous viewers in the chairs with the head rests limiting lateral movements of the head (or eyes) in the limits of ocular stereobase width (65-75 mm in horizontal plane) and vertical movements in the limits of diameter of projection lenses of the stereoprojector (65 mm) and moving apart from the back rest to a distance of up to 65-100 mm with a possibility of head inclination and wide-frame viewing requires video correction of the stereoframes individually for each viewer. Auto-correction of the stereoprojector and stereo lenses isn't required as the stereoprojection convergence on the screen can be achieved by means of video displacement, inclination or rotation of the stereoframes relative to the optical axes of projection lenses of the stereoprojector. Video correction ensures dynamic (in synchronism with viewer's head inclination) correction of the projection convergence into the stereoscreen center, video correction of the geometrical parameters, perspective and scale of the stereoframes (connected with the lens curvature of the projection stereoscopic lenses and the stereoscreen sphere) for improvement of visual comfort of viewing of the screen stereoprojections with account of ocular convergence and focal points. This allows many hours long viewing without eyes weariness but limits viewing comfort due to small possible displacement of the viewer's head. Such systems are optimal for the spherical mirror stereoscopic glasses and movable and portable stereodisplays.

6. A full comfort system with a wide-frame and large stereoscreen for a large number of viewers and unlimited duration of the stereoprojection viewing requires a set of systems for: monitoring of the viewers' eyes and faces, monitoring and auto-correction of convergence of sphere centers of the stereoscreen sections or the entire stereoscreen, auto-correction of the coordinates and rotation of the stereoprojectors, auto-focusing and auto-correction of displacement of projection lens of the stereoscopic lens assemblies for auto-correction of their stereobase and convergence of optical axes, optico-mechanical correction and video correction of the stereoframe formation systems in the stereoprojectors, auto-correction of position of the programmed sphere center of the stereoscreen or convergence of sphere centers of all the sections of the stereoscreen into the single programmed center. Such systems are optimal for home video centers, large cinema halls, conference rooms and lecture halls. Such a set of systems ensures all necessary corrections of the optical systems of forming of the stereoframe projections for: full comfort stereo viewing without duration limitation, free movement of viewers in front of the screen, viewing at big angles to the main optical axis of the stereoscreen and with ample field of vision (over 60°), viewing in dioptrical or sun glasses as well as without glasses, viewing in conditions of displacement or disorientation of sphere centers of the sections of large assembled stereoscreen or of the entire screen.

In yet another contradistinction (according to the claim 2) inside the stereo projectors movable projection units for forming of the primarily stereopair images with one-frame or two-frame reflecting screens are incorporated. The screens are located in front of projection lenses of the stereoscopic lens assembly in the plane of the projected objects (left and right frames of the stereopair) for distinct stereoprojection of these stereopair frames onto the stereoscreen by the stereoscopic lens assembly. The assemblies include auto-drives for horizontal and longitudinal (along the optical axes of the lenses of the assembly) displacement of this assembly and auto-focusing of the unit lenses onto the reflecting screen in the unit. According to the claim 3 this reflecting screen is made with raster of spherical micromirrors for separate orientation of the projection flows of the left and right stereopair frames into the entrance pupil of the corresponding projection lenses of the stereoscopic lens assembly. The reflecting screen is located in front of projection lens in the plane of the objects clearly represented on the stereoscreen.

In yet another contradistinction (according to the claim 3) the reflecting screen inside the stereoprojector is made with a raster of microspherical mirrors. Sphericity and orientation of these micromirrors is chosen for concentration and direction of the projection beam of left and right frames of the stereopair in entrance pupil of the corresponding projection lens of the stereoscopic lens assembly. Thereat mutual superposition of the stereopair frames on this screen provides that each frame is reflected by this screen only in its projection lens of the stereoscopic lens assembly. The lens raster is located in front of the projection lens of the stereoscopic lens assembly in the plane of the objects clearly represented on the stereoscreen.

Alternative embodiment of the claim 3 (as in the claim 4) is another unit forming stereoframes in the stereoprojector with wide-frame light emitting diode or OLED matrix or illuminated LCD matrix. On the surface of such matrices from the projection lenses' side a lens raster is mounted. The matrix has horizontally and vertically alternating lines for forming of left and right frames of the stereopair. Each raster lens is made and positioned with a possibility of separate direction of projection beams of the horizontally adjacent pixels of the left and right frames of the stereopair in the entrance pupil of the corresponding projection lenses of the stereoscopic lens assembly. The lens raster is positioned in front of the with projection lens of the stereoscopic lens assembly in the plane of the objects clearly represented on the stereoscreen.

In yet another alternative embodiment of the claim 3 or 4 (as in the claim 5) the unit for forming of the stereopair frames in the stereoprojector contains the DPL matrix. This matrix is installed in the plane of the stereoframes forming. In front of this matrix from the projection lenses' side in two calculated zones in the horizontal plane two RGB-illuminators on a basis of the light emitting diodes of red R, blau B and green G colors are installed. These illuminators illuminate alternatively from different directions the DLP matrix with alternating frequency-response changes of R-red, B-blau and G-green colors (illumination frequency forms color and brightness half tones of the stereoimages). Different incidence angles from the illuminators on the micromirrors of the DLP matrix forming alternatively left and right color frames of the stereopair by this common matrix provide reflection of the projection beams from the micromirrors in the corresponding projection lens of the stereoscopic lens assembly. For this purpose the matrix micromirrors are oriented for working deflections in the states "on" and "off" in the vertical plane. The matrix mirrors plane is positioned in the plane of the objects clearly represented on the stereoscreen.

The similar technical effect for embodiments 3, 4 and 5 is a provision of the wide-frame projection of the stereopair frames. For the wide-frame projection with the vision field angle up to 70° in horizontal plane and up to 60° in vertical plane (for increasing of the stereoeffect depth and comfort of stereoviewing) in the stereoprojector on the common screen of the projection unit and on the common matrix the stereopair frame are partially superposed in the common zone of the projected stereopair frame generation which simplifies design, decreases mass and dimensions of the stereoprojector and renders pixel structure on the screen less visible. Thereat the video corrector performs video correction of the stereobase of the projected stereopair (displacement of the frame centers of this stereopair along the axis between the frame centers) with zero vertical parallax. Displacement of the prepared for projection stereopair frames along the optical axes following the lines perpendicular to these axes and rotation of the plain (around the normal line to the plain of the optical axes of the projection axes of the stereoscopic lens assembly) of these reflecting screens of the projection units or these matrices of the stereo lens assembly is ensured by auto-correction in the stereoprojector by means of the auto-drives with consideration of the viewers' position relative to the stereoscreen and ocular convergence angle.

In yet another contradistinction (according to the claim 6) the stereoprojector is made with a possibility of gradual decrease of resolution at the edge along the border of the formed stereopair frames. This video effect is achieved by the video controller in which a video correction program is provided reducing border resolution. In another embodiment for reducing of resolution along the borders in the plane of the stereopair frame generation a photomask distorting the image edges on the stereoscreen borders is installed. In yet another embodiment a matrix forming the projected stereopairs is preliminary made with gradual decrease of pixel density or programmed video resolution towards the frame border.

Technical effect—considerable decrease of the pushing border effect (visual perception of the image displacement towards the plane of the stereoscreen, cut by the stereoscreen borders). this considerably improves stereoeffect.

In yet another contradistinction (according to the claim 7) the reflecting spherical stereoscreen is suspended on the ceiling horizontally or inclined. In front of the viewer an inclined flat screen with semitransparent mirror is located. The stereoprojector is located behind the flat screen. The stereoprojector is oriented onto the flat screen for projection in the aperture (through this flat screen to reflecting spherical screen). The flat screen is inclined to the main optical axis of the stereoscreen and oriented relative to the viewer's eyes so that projection (focused by the spherical stereoscreen) reflects from this flat screen in the viewer's eyes.

Technical effect achieved by this embodiment is a maximal visual comfort of the stereoviewing maximally approaching angle of the projection center (with minimal orientation angle of the main visual line to the main optical axis of the stereoprojector) which considerably decreases geometrical distortions of the stereoprojection and required number of the auto-drives, auto-correction programs and/or video correction. This is achieved by optimal matching of vision angles (points in a space) of the central points of video registration, projection angles and viewing angles. Such a design considerably reduces projection space in the horizontal plane limiting them to a distance between the viewer and flat mirror screen which is convenient for surrounding persons and comfortable for the viewer.

In yet another contradistinction (according to the claim 8) the tracking system is designed for preliminary measuring of the coordinates of open eyes, pupils, face profile, nose, eyebrows, mouth and subsequent registering of these parameters in the auto-corrector and/or video corrector memory. The auto-corrector and/or video corrector is programmed for a possibility to execute control signal of auto-correction for the viewer with closed eyes. For this purpose the auto-corrector and/or video corrector are provided with the auto-correction program based on the coordinates of face, eyebrows, nose and mouth registered in the electronic memory for subsequent auto-correction or video correction.

Technical effect—reliability of auto-correction of the stereoprojection for blinking eyes, for low visibility of the eye pupils for the video camera (in the tracking system) and for the eyes behind the glasses.

In yet another contradistinction (according to the claim 9) the projection lenses with the auto-corrector of their focusing provide a possibility for a viewer to choose individual program of auto-focusing auto-correction. The auto-corrector's program accounts for this individual auto-correction compensating different glasses dioptries of short-sighted or long-sighted viewers.

Technical effect—optimal auto-focusing of the stereo lenses for clear and comfortable viewing of the stereoprograms by short-sighted or long-sighted viewers without dioptricalal glasses. Furthermore, a possibility of physical training of the ocular muscles is provided by way of prolonged viewing of stereoprograms created for curing ocular defects with gradual, individually programmed reduction of the glasses dioptries.

In yet another contradistinction (according to the claim 10) on the exit pupils of projection lenses of each stereoscopic lens assembly a (on exit lenses) porous raster optical filter is installed. The filter is made with black antiglare coating on both sides. Filter pores are of round, quadrate or slot shape and transmits a part of the projection beams. The filter thickness, number and diameter of pores, raster interval between the conjugate pores as well as distance between filter and the stereoscreen are chosen with a view to make the filter barely visible against the background of the observed stereoimage considerable absorption of projection and parasitic beams and effective transmission of the projecting beams on the stereoscreen up to the level of visual perception, image contrast and clearness as well as increase depth of the stereoeffect.

Technical effect—visual improvement of vision, contrast and clearness of stereoimages, depth of the stereoeffect (at optimal brightness of the stereoprojection). This is achieved by effective light absorption (by the black antiglare coating of the porous filter) of some part of projecting beams, external parasite light penetrating to the stereoscreen and external lenses of the projection lenses (causing glare on the lenses and on the screen).

In yet another contradistinction (according to the claim 11) the tracking system in the stereoscopic projection system monitoring the eyes position data allows precise measurements of coordinates of the eye pupil centers. In the stereoprojector or stereoprojectors and instead of stereoscopic projection lenses an optical system of projection magnification on the stereoscreen is installed for forming of stereoprojections (reflected and focused by the stereoscreen) with stereovision focal points focused on the eye pupils. Thereat aperture of the projection beams on the eye pupil is formed by the system considerably smaller than the pupil diameter. The optical magnification system is made as an aperture LCD matrix connected with the video corrector for electronic and optical forming and displacement (on the projection beam territory) of two point transparent video apertures (transparent video holes). Trough these video apertures projection beams pass from the stereoprojector onto the stereoscreen (with exit from the point focus in the stereoprojector optical system). In another embodiment the optical system of projection magnification is made with an LCD transreflecting matrix or with micromirror DLP-matrix for electronic and optical forming and displacement of two point micromirrors. From these micromirrors the projection beams of the stereoscreen are reflected onto the stereoscreen which focuses projections of left and right frames of the stereopair in point focal stereovision zones in the pupils of the left and right eyes respectively. Thereat the aperture of the focal point of the projection focusing in the eye pupil is chosen considerably smaller then pupil surface with consideration of vision and comfort improvement.

Technical effect—elimination of oculars for distance between the eyes and the stereoscreen less than 250 mm as the eye observes through the crystalline microaperture which dramatically improves vision and allows free ocular focusing for clear observing of the stereoframes irrespectively of the distance between the eye and the screen. This allows unlimited stereoviewing of the stereoprograms in reflecting spherical glasses and on the stereoscreens located at a distance of 20-1000 mm from the eyes providing a possibility to use the stereosystems with ample field of vision and minimal dimensions and weight of the stereoscreen and entire system. Improvement of the visual comfort of stereoviewing is achieved due to increase of visual clearness and contrast of the observed stereoimages and improvement of vision. Even a shortsighted of farsighted person without glasses sees more details on a screen stereoimages than at observing of real objects due to maximally narrowed pupil of the eye. Thereat accommodation is maximally equalized with convergence and the brain better perceives depth of stereoeffect. Such stereosystems don't cause shortsightness or farsightness even in case of prolonged viewing of stereoimages which is extremely efficient for unlimited stereoviewing and for vision protection and programmed training of the ocular muscles in curing shortsightness or farsightness. Additional effect—maximal simplicity of the stereolens design due to the lens elimination (causing optical distortions and glares). Flat stereoscreens with micromirror raster are thin and light. The stereosystem with a flat stereoscreen and stereoprojector fastened close to the screen border is considerably smaller and lighter than that with spherical screen.

In yet another contradistinction (according to the claim 12) the stereoscreen is mounted on the auto-drives and movable along all the coordinate axes and can rotate around these axes. The stereoscreen is made as a table top movable monitor or notebook display. The stereoprojector with auto-drives is movable and comprises movable projection lenses. The stereoprojector is mounted in front of the stereoscreen on a support or hanged on the viewer's breast. On the stereoscreen a tracking system is located for monitoring of the viewer's eye pupils. An auto-collimator is mounted on the stereoprojector for monitoring of curvature center of the stereoscreen sphere. The auto-corrector is connected with the tracking system monitoring the viewers' eyes or pupils, video corrector and auto-drives of the stereoscreen and stereoprojector. The video corrector is connected with the unit forming stereopair frames. All the system elements are designed with a possibility to provide software dynamic continuous auto-correction or video correction of the stereoscopic projection system in case of displacement of the stereoprojector relative to the stereoscreen. The auto-correction and video-correction are synchronized with the viewers' movements, or movements of their eyes or pupils. At a distance less than 1 m from the eyes to the stereoscreen a stereoprojection focused in the point focal zones of stereovision on the eye pupils (according to the claim 11). Thereat the stereoscreen can be spherical, or flat with the micromirror raster focusing the stereoframe projections in the point focal zones in the eye pupils like a reflecting spherical screen.

Technical effect—focused point projection ensures full comfort stereovision on the stereoscreen located close to the eyes of the short-sighted of long-sighted persons without dioptrical glasses. Additional effect—maximal simplicity of the stereoprojection system design, lower weight and dimensions (for desk top and portable embodiments).

In yet another contradistinction (according to the claim 13) stereoscopic projection system is head mounted like a helmet display or usual glasses. The system comprises stereoprojector with the auto-drives, stereoscreen with tracking system monitoring the eye pupils, auto-corrector and video corrector. The stereoscreen is made as spherical or parabolic reflecting glasses with curvature center of the stereoscreen located close to the viewer's eyes. The stereoscreen is intended for the point focused projection in the eye pupils. The auto-corrector is connected with the video corrector, eye pupils tracking system and the stereoscreen auto-drives. Two small projectors (one for projection of the left frame, another—for the right frame) are mounted above the viewer's eyes so that left frame projection of the stereopair is focused by the stereoscreen mirror sphere (mirror glasses) in the pupil of the left eye, and right frame projection—in the pupil of the right eye. Mating of all the optical parts of the system allows auto-correction or video correction of the stereoprojectors in case of change of position or orientation of the stereoscreen, viewer's eye pupils (for ocular convergence or change of the ocular stereobase or distance from the pupils to the stereoscreen). Switching off of the auto-correctors is possible for manual precise positioning of the stereoscreen relative to the eyes and the stereoprojectors stereobase for the ocular stereobase.

Technical effect—provision of maximal visual comfort of stereoviewing with maximal vertical and horizontal angles of the vision field and very simple, light and mobile design of the stereoscopic projection system. The focused stereoprojection ensures free ocular focusing with maximal agreement of the ocular convergence with variable ocular focal point which results in full comfort stereoviewing of the stereoimages without dioptrical glasses, glare and optical oculars (in the stereoscopes and helmet stereo displays). As compared with observing of real objects improved vision and image clearness for the stereoviewing and greater range of stereo planes are achieved. Additional effect—maximal simplicity of the stereoprojection system design, minimal weight and dimensions.

In yet another contradistinction (according to the claim 14) the movable stereoscreen is suspended on the auto-drives for auto-correction of displacement of this stereoscreen along any coordinate axis and/or rotation of this stereoscreen around these axes, On the stereoscreen a tracking system is located monitoring position data of the viewer's eyes or pupils of the eyes and/or face elements. The tracking system is connected with the auto-corrector, video corrector and auto-drives of the stereoscreen and stereoprojector. The video corrector is connected with the unit forming the stereopair frames with a possibility of software dynamic auto-correction and/or video correction of the stereoscopic projection system. The software auto-correction is dynamic and synchronized with displacement and/or turn and/or inclination of the viewer video controlled by the tracking system. The program takes into account optimal stereoscreen position, its orientation relative to the viewer's face and distance from the viewer's eyes, ocular convergence and change of the ocular focal point.

Technical effect—full freedom of the viewers' movements, comfort use of the stereoscopic projection systems without disturbing other people under the idle stereoscopic systems provided they can be slightly lifted to the ceiling automatically or manually.

In yet another contradistinction (according to the claim 15) in the stereoscreen of the stereoscopic projection system is made flat with micromirror raster focusing stereoprojections in the point focal zones of the eye pupils Projectors of the left and right frames of the stereopair are located closer to the stereoscreen edge. The stereoscreen consists of two movable parts with the auto-drives, auto-correctors and video correctors. One of the screen parts is movable relative to another part of this screen. On each part of the screen projector for the left frame of the stereopair is fastened and focused and on the screen part—projector for the right frame of the stereopair. The stereoscreen and its parts are mounted on the auto-drives connected with the auto-correctors for movements of this stereoscreen along the coordinate axes and rotation of the stereoscreen around these axes. The movable part of the stereoscreen is mounted on the auto-drive with auto-corrector of the horizontal displacement of this part of the screen relative to another part for dynamic alignment of the focal zones of left and right frames of the stereopair with the pupils of the corresponding eyes for different stereobases in case of displacement and inclination of the viewer's head or change of ocular convergence.

Technical effect—dynamic alignment of the stereovision focal zones with the eye pupil centers in the systems with a flat stereoscreen with micromirror raster. Creation of compact portable and movable stereo systems, notebooks with stereoscreens located close to the viewer's eyes.

Use of the stereoprojection is optimal with preliminary program testing of the stereoscopic projection system itself, viewers faces and eyes. For this purpose before the viewing of a program a video stereoscopic test is demonstrated automatically for each viewer. Small-sized stereoscopic test images are presented to the viewer on a black background in the various points of viewing on the stereoscreen with different parallaxes (negative, neutral and positive). Simultaneously with demonstration of each test element by way of visual text on the screen or acoustic message the viewer is asked to turn and incline his head and to observe these pictures with ocular convergence. At the same time the system of tracking of the viewers' eyes (without glasses) and face notes precise coordinates of the viewers' eyes relative to the face and the stereoscreen. This data are stored in the processor memory individually for each viewer for individual auto-correction of the stereoprojectors and video correction of the stereo frames. The viewer himself has to input additional information concerning his eyes parameters (difference of eye magnification, glasses dioptries, stereobase of his eyes). After this a test stereo program is demonstrated for visual checking of correct programmed functions of all the elements and systems of the stereo projection. These step fulfilled stereoscopic programs can be demonstrated.

In order to ensure programmed work of all the systems of auto-correction and video correction the electronic memory of the auto-correctors and video correctors can be programmed with programs containing statistical parameters of auto-correction and video correction on a basis of the data of the reference adjusting and positioning of the stereoscopic projection system and video correction of the stereoimages for all coordinates relative to the viewers' position and ocular focal points, stereoprojectors and stereoscreen in order to ensure full comfort stereo viewing. In another embodiment well-known and new programmed mathematical computer algorithms can be used for this purpose.

BRIEF DESCRIPTION OF DRAWINGS

FIG. 1 shows a frontal aspect of the functional scheme of a stereoscopic projection system for cinema with auto-correction of optical elements of the system.

FIG. 2 shows design of a stereoscopic projection system with a stereoscreen suspended on the ceiling in inclined position.

FIG. 3 shows design of a stereoscopic projection system with a stereoscreen suspended on the ceiling in horizontal position.

FIG. 4 shows plane of optical scheme of dynamic auto-correction for orienting of optical elements of the system.

FIG. 5 shows flow chart of a stereoscopic projection system with auto-correction of optical elements of the system.

MODES FOR CARRYING OUT THE INVENTION

Figure 6:
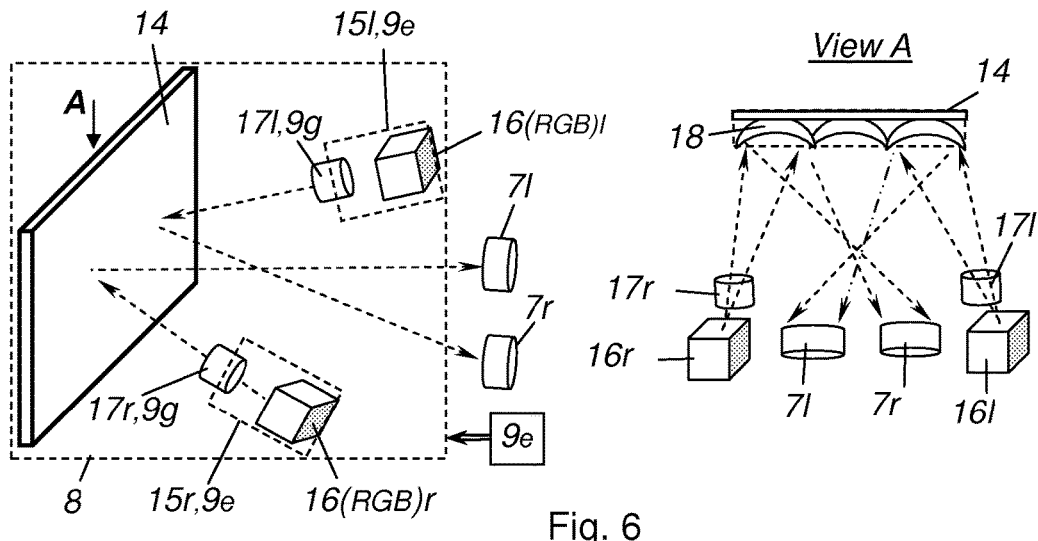
FIG. 6 shows design of a stereoprojector with two inner projectors and oriented reflecting screen.

FIG. 1 shows a stereoscopic projection system intended for cinema, theaters, video theaters, concert halls, studios, gymnasia, conference rooms, and other video halls with a large number of viewers (50-500 persons). A big reflecting spherical stereoscreen 1 with surface of 10-100 m$^2$ and mirror sphere radius $R_s$ (10-40 m) is fast mounted on the auto-drives 2. $S_s$—an apex of the stereoscreen reflecting sphere radius. $M_s$—programmed center of the stereoscreen reflecting sphere, $R_s$—radius of this sphere, $S_s$—pole of this sphere. Above the stereoscreen on a hanged bracket a tracking system 3 is mounted with left $4_l$ and right $4_r$ video cameras for monitoring of the viewers' eyes position. In the point $M_s$ an auto-collimator 5 is mounted for monitoring of orientation of the stereoscreen reflecting sphere. In front of the stereoscreen above the viewers stereoprojectors 6 are mounted (one for each viewer) with movable projection lenses 7, projections units 8 for forming the projected stereopair frames in the stereoprojectors and auto-drives 9 for auto-correction of optical elements in the stereoprojectors. The stereoscreen with mirror surface more than 0.3 m$^2$ for high precision of the reflecting sphere can be assembled from a number of spherical reflecting sections (0.25-0.5 m$^2$). The system comprises auto-correctors 10 connected with the tracking system 3, auto-drives 2 and 9, video correctors 11 and auto-collimator 5. The viewers, stereoprojectors and their elements, as well as the stereoscreen or its reflecting spherical sections can move along the coordinate axes x, y and z and be rotated around these axes at angles $\alpha_x$, $\beta_y$ and $\gamma_z$ by the auto-drives. Angles ω—incidence angles of the projecting beams a1, a3 emitted by the stereoprojector onto the screen and beams a2, a4 reflected by the stereoscreen in the viewers' eyes. Arrow $b_l$ shows the beams of the viewers' images registered by the left video camera $4_l$ of the tracking system 3; arrow $b_r$ shows the beams of the images registered by the right video camera. Arrow c shows control signals of the tracking system 3 sent to the auto-corrector 10. The arrow d shows the auto-collimator beams scanning the stereoscreen, arrow e shows control signals from the auto-collimator 5 to the auto-corrector 10, arrow f shows control signals from the auto-corrector 10 to the video corrector 11. Arrow g shows control signals from the auto-corrector 10 to the auto-drives 9 of the stereoprojectors 6, arrow h shows control signals from the video correctors 11 to the units 8 (forming of the projected frames). Arrow i shows control signals from the auto-corrector 10 to the auto-drives 2 of the stereoscreen.

FIG. 2 shows a stereoscopic projection system with the stereoscreen 1 mounted on the suspension bracket. On the suspension bracket a flat semi-transparent mirror 12 is mounted inclined to the projection optical axis (serving as a stereomonitor) on which an image is observed focused by the stereoscreen 1 onto the mirror 12.

FIG. 3 shows a stereoscreen 1 with a flat mirror 12 (stereomonitor); on the mirror 12 an auxiliary flat mirror 13 is suspended. On the stereoscreen 1 the stereoprojector and tracking system 3 are suspended. Under the projection system a working table is installed (or a bad for a sick person in a hospital). This table is separated from the stereoscopic projection system by free working zone. The screen 12 is positioned at 45° to the main projection axis of the stereo-projector 6, while the screen 13 is positioned at 45° to the main projection axis and at 90° to the stereoscreen 12. The screen 13 is intended for vertical deflection of projection in order to clear the working zone over the working table (for carrying out of different works on this table). In the system with the stereoscreen suspended on the ceiling the most part of the projection zone is located vertically or at 45° to the vertical axis. This clears the zone behind the flat screen 12 which provides for a free space or allows to install more projection systems in the room.

FIG. 4 shows position r of the right eye and position 1 of the left eye. $O_e$—the stereobase center of these eyes. $O_s$—center of the stereoprojector 6 rotation realized by the auto-corrector. 8—projection unit with a matrix or reflecting mirror for forming of the left frame $8_l$ and right frame $8_r$ of the horizontally projected stereopair. Δx—direction of horizontal displacement, Δy—direction of vertical displacement of the stereopair frames in the stereoprojector realized by the auto-corrector or video projector. $7_l$—projection lens of the stereoscopic lens assembly for projecting left frame of the stereopair and $7_r$—projection lens of the stereoscopic lens assembly for projecting right frame of this stereopair. a1—main (central optical) axes of the stereo projection. $a_l$—optical axes of projection of the projection lens $7_l$, $a_r$—optical axes of projection of the projection lens $7_r$; $a2_l$—projection beams from the lens $7_l$ reflected by the stereoscreen 1 in the l—left eye and $a2_r$—projection beams from the lens $7_r$ reflected by the stereoscreen 1 in the r—right eye. $\Delta\epsilon$—limit of horizontal displacement of the movable projection lens $7_l$ realized by the auto-regulator. $\Delta\phi$—convergence angle of the projection lenses of the stereoscopic lens assembly equal to the angle $\phi_y$ of rotation of the lens $7_l$ optical projection axes around the vertical axes y.

FIG. 5 shows auto-correctors: 9a—for correction of displacements of the stereoprojector 6 along the coordinate axes x, y and z; 9b—for correction of the stereoprojector rotation at the angles $\alpha_x$, $\beta_y$ and $\gamma_z$ (around the coordinate axes); 9c—for auto-focusing of the projection lenses $7_l$ and $7_r$ of the stereoscopic lens assembly by means of their displacement at $\Delta f$ along their optical axes; 9d—for correction of the stereobase (horizontal displacement of this lens along the stereobase line at $\Delta\epsilon$ width); 9g—for auto-focusing of the lenses $17_l$ and $17_r$ in the projection units 8; 9f—for correction of displacement of the projection units $8_l$ and $8_r$, or for displacement of the LCD matrices $8_l$, $8_r$ (forming projected frames of the stereopair) and 9e—for correction of convergence angle $\Delta\phi$ of the stereoscopic lens assembly (angles of inclination of the projection optical axis $a_r$ (lens $7_r$) and projection optical axis $a_l$ (lens $7_l$). Video corrector provides for electronic and optical video correction of scales and geometrical distortions of the projected frames of the stereopair formed by the matrix $8_{l,r}$ or 16 (RGB)$_{l,r}$. The auto-collimator 5 ensures convergence of the stereoscreen sphere center (or centers of the reflecting spherical sections of the stereoscreen) into the single programmed center $M_s$ by means of the auto-drives 2 and signals k from the auto-corrector 10.

FIG. 6 represents a design embodiment of the unit 8 for forming of the stereopair frames. The unit comprises reflecting screen 14, projection optical units $15_l$—for projection of the stereopair left frame onto the screen 14 and $15_r$—for projection of the stereopair right frame onto the same screen. The units contain the auto-drives 9e for displacement of the units 15 perpendicularly to the screen 14. The units $15_l$ and $15_r$ contain optical units with the LCD RGB-matrices 16 (RGB)$_l$ and 16 (RGB)$_r$ with illumination of the determined matrix by its light emitting diode in determined foreshortening and of determined color: R—red, G—green or B—blue). The unit $16_l$ is intended for forming of the left projected frame of the stereopair and the unit $16_r$—for the right frame. In front of the screens 14 projection lenses $17_l$ and $17_r$ are installed with the auto-drives 9g for auto-focusing of these lenses. The drawing (View A) shows the reflecting screen 14 made with raster 18 consisting of spherical micromirrors for separate orientation of projection beams of the stereopair left frame projected by the unit $15_l$ in the projections lens $7_l$ (of the stereoscopic lens assembly) and orientation of beams projected by the unit $15_r$ in the lens $7_r$.

Figure 7:
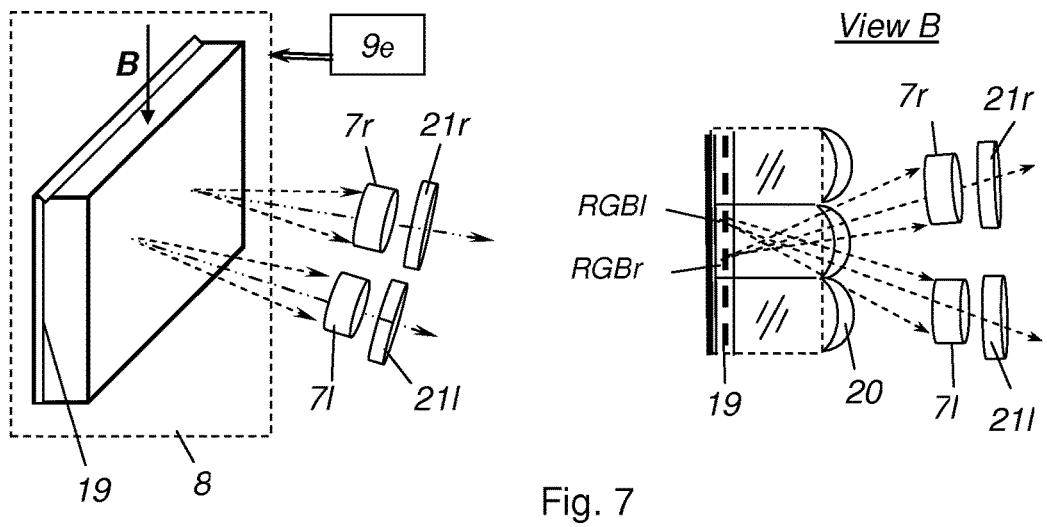
FIG. 7 shows design of a stereoprojector with a matrix display and lens raster.

FIG. 7 shows yet another embodiment of the unit 8 for forming of the stereopair frames. The unit comprises a LCD or OLED matrix 19 with lens raster 20 (drawing B) consisting of spherical microlenses. The matrix forms stereopair images as RGB vertical horizontally alternating lanes (RGB$_l$ lines for the left frame and RGB$_r$ lines for the right frame of the stereopair). The color sub-pixels in each line alternate vertically. Each pair of the conjugate lines RGB$_l$ and RGB$_r$ is projected by vertical line of lenses of this lens raster so that images of the pixels RGB$_l$ lines are projected to the projection lens $7_l$ and pixels of the RGB$_r$ line—in the lens $7_r$. On the exit lenses of the projection lenses $7_l$ and $7_r$ porous or cross-grating black color filters $21_r$ and $21_l$ are installed for antiglare protection of the projection lenses from external light flare and improving of vision and depth of stereoeffect.

Figure 8:
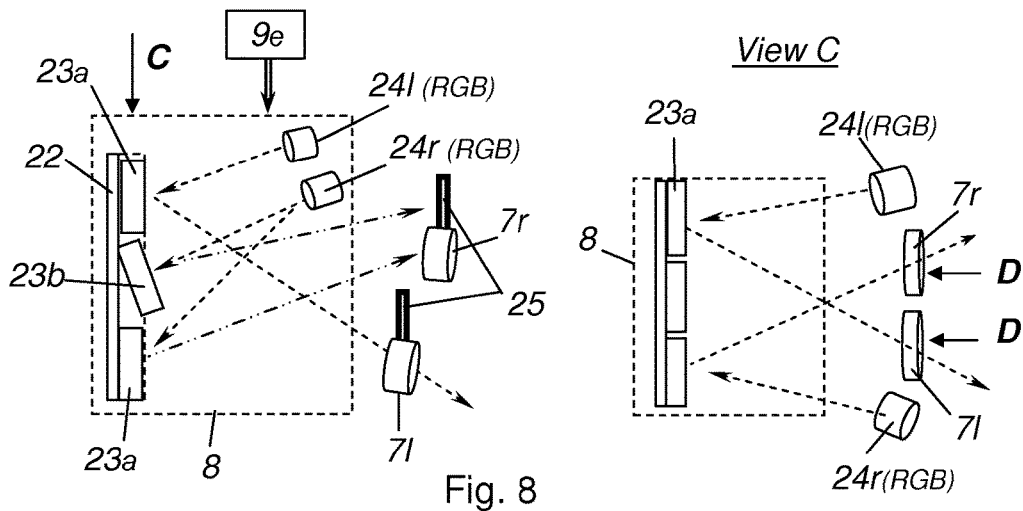
FIG. 8 shows design of a stereoprojector with DLP (micromirror) matrix and two illuminators orienting projections.

FIG. 8 shows yet another embodiment of the unit 8 for forming of the stereopair frames. This unit contains the DPL matrix 22 with micromirrors 23 (for forming of color half-tone pixels according to well-known DLP digital technology of color processing and forming). The micromirrors 23 are located with consideration of their working deflections in vertical plane perpendicular to the matrix. From both sides in horizontal plane in front of the micromirrors three-color light emitting diodes are located: $24_l$ (RGB)—for forming of the left frame and $24_r$—for forming of the right frame of the stereopair (by means of alternate switching on of red, blue and green colors, for example with frequency 30 Hz). Above the projection lenses $7_r$ and $7_l$ black absorbers 7a are installed (for absorption of the projection beams, deflected by the matrix micromirrors).

All the three embodiments of the projection units on the FIGS. 6, 7 and 8 ensure forming of wide-frame frames of the projected stereopair in the common plane of their forming in the stereoprojector. This provides for wide-frame projection with improved stereoeffect and minimal dimensions of the stereoprojector.

Figure 9:
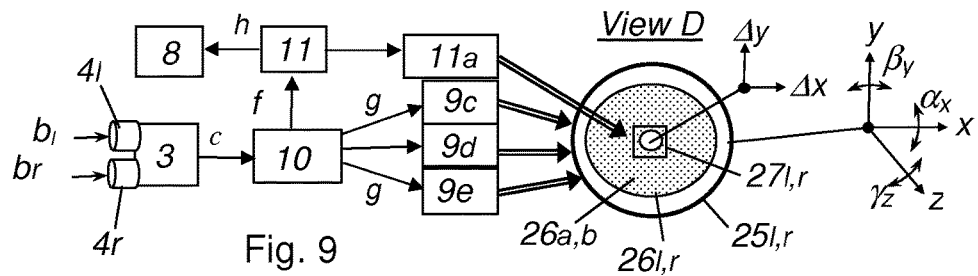
FIG. 9 shows flow chart a stereoscopic projection system with desk top stereoprojector of collimated beams.

FIG. 9 shoes the projector $25_l$ comprising the system of optical magnification of the projection $26_l$—left frame of the stereopair and projector $25_r$—right frame of the stereopair. Optical systems $26_l$ and $26_r$ emit projection from the point focus of point aperture of the microseptum or micromirror and direct it on the stereoscreen which focuses the projection into two micropoint focal zones of stereo vision (one focal zone of stereo vision is focused by the stereoscreen on the left pupil of the eye, another focal zone of stereo vision is focused by the stereoscreen on the right pupil of the eye) These optical systems $26_l$ and 26r comprise LCD rear-projection display 26a for transmission of the projection beams from the stereoprojector onto the stereoscreen. In another embodiment the optical system consists of the transreflecting display 26b with mirror bottom layer under the LCD matrix in the form of mirror reflecting display the mirror pixel of which directs all the projection beams from the stereoprojector onto the stereoscreen. The rear-projection display comprises the video corrector unit 11a for forming and horizontal displacement in the limits of $\Delta x$ and vertical displacement in the limits of $\Delta y$ (by means of video signal) in the plane of the display of rear-projection transparent pixel—video aperture $27_l$ (for projection of the left frame in the left eye) and $27_r$ (for projection of the right frame in the right eye). In another embodiment the mirror display comprises the video corrector unit 11a for forming and deflection (by means of video signal) of the mirror pixel—micromirror in the plane of the display. In both embodiments surface of these pixels is formed considerably smaller than surface of the pupil of the eye. Alignment of focal zones of stereovision with the viewer's eye pupil ensures improved vision, and clearness of the visible screen stereoimage, for only central microzone of the eye crystalline lens works and eye accommodation is free from convergence and doesn't depend of the distance from the stereoscreen. Auto-correction of optical system displacement by means of the auto-corrector 10 and electronic and optical video correction of displacement of position of the microaperture or micromirror $27_l$ and $27_r$ by means of video corrector 11 is programmed in synchronism with coordinates and movements of the viewer's pupils of the eyes. Displays 26a and 26b are made with black antiglare coating.

Figure 10:
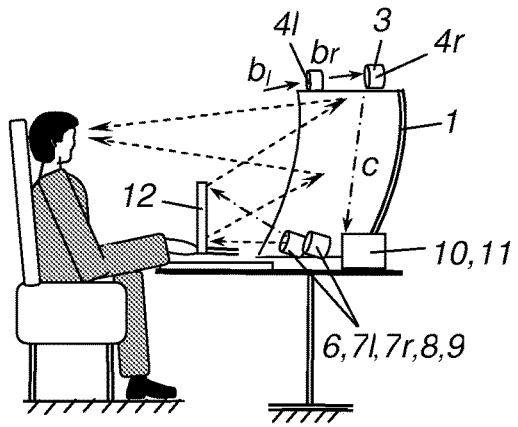
FIG. 10 shows design of stereoscopic projection system with a desk top and reflecting spherical mirror.

FIG. 10 shows a desk-top embodiment of the stereoscopic projection system (stereomonitor) with the reflecting spherical stereoscreen 1. The movable stereoprojector 6 is mounted on the stereoscreen 1 on the auto-drives 9. In front of the stereoscreen half way between the viewer and the stereoscreen the flat mirror 12 is positioned which is convenient and provides for compact construction for the desktop embodiment. The projection lenses $7_l$ and $7_r$ of the stereoprojector are oriented on the flat mirror 12 to direct the projection onto this mirror and than reflection of this projection from the mirror 12 onto the stereoscreen 1. The auto-corrector 10 ensures auto-correction of displacement and rotation of the stereoprojector and its projection lenses, while the video corrector 11 ensures video correction of the stereoframes according to parameters of the viewer's eyes and optical characteristics of the stereoscopic system.

Figure 11:
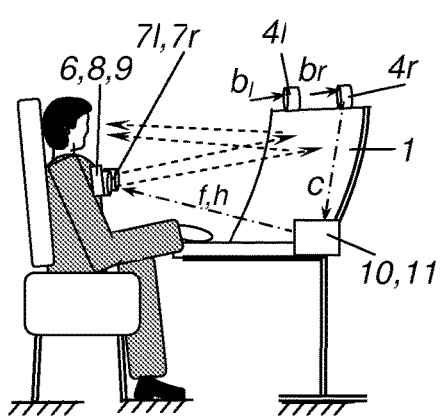
FIG. 11 shows design of a stereoscopic projection system with a reflecting spherical notebook monitor.

FIG. 11 shows a portable notebook with reflecting spherical stereoscreen 1 and stereoprojector 6 placed in front of the stereoscreen on the viewer's breast for stereovision under moving conditions.

Figure 12:
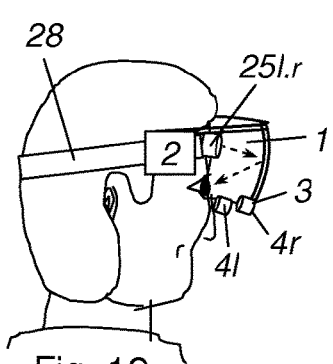
FIGS. 12 and 13 show design of a head mounted stereo-projection system with a reflecting spherical screen in the form of glasses.
Figure 13:
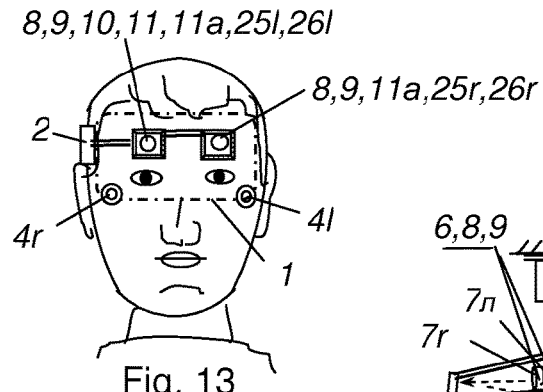

FIGS. 12 and 13 show a head-mounted stereoprojector with a reflecting spherical stereoscreen in the form of the mirror glasses. The system is fixed on the head by means of an elastic rim or a strip 28. On the forehead in front of the stereoscreen two microprojectors are fixed: $25_l$—the projector forming left frame and $25_r$—the projector forming right frame. The projectors comprise the movable microprojection units 8 mounted on the auto-drives 9. The optical systems of projection magnification $26_l$ and $26_r$ are intended for forming of point focal zones of stereo viewing of left and right frames of the stereopair (focused by the stereoscreen 1 in the pupils of the corresponding eyes of the viewer). On the stereoscopic glasses the micro video cameras $4_r$ and $4_l$ are mounted with the tracking system 3 for monitoring of the pupils of the eyes, connected with the auto-correctors 10 and video corrector 11. The stereoscreen 1 is movable and mounted on the auto-drive 2, which allows performing of auto-correction.

Figure 14:
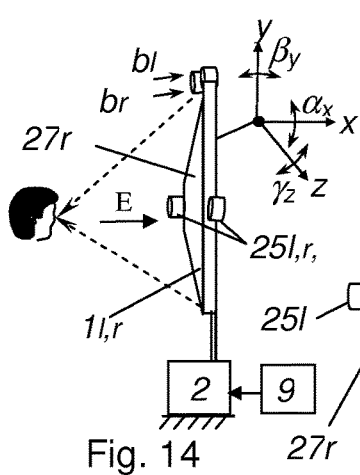
FIG. 14 shows design of a stereoscopic projection system with movable flat mirror raster screen.

FIG. 14 shows the stereoscreen consisting of two movable parts with micromirror raster. The first part of the stereoscreen $1_l$ comprises a raster of flat micromirrors inclined so that they provide point focusing of all the projection beams from the projector $25_l$ in the pupil of the left eye. The second part of the stereoscreen $1_r$ comprises a raster of flat micromirrors inclined so that they provide point focusing of all the projection beams from the projector $25_r$ in the pupil of the right eye of the same viewer. The projector $25_l$ (forming projection of the left frame of the stereopair) fastened on the first part of the stereoscreen $1_l$ and fast focused onto the trapeziform mirror $27_l$ (fastened on the right lateral face of the stereoscreen $1_l$ and inclined relative to the plain of the stereoscreen for dispersing of the projection on the entire surface of the stereoscreen $1_l$). The projector $25_r$ (forming projection of the right frame of the stereopair) fastened on the second part of the stereoscreen $1_r$ and fast focused onto the trapeziform mirror $27_r$ (fastened on the lateral face of the stereoscreen $1_r$ and inclined for dispersing of the projection on the entire surface of the stereoscreen $1_r$). The stereoscreen part $1_l$ is movable and mounted on the auto-drive $2_l$ of the stereoscreen for auto-correction (by the auto-corrector 9) of the stereoscreen displacement jointly of the both parts of the stereoscreen $1_l$ and $1_r$) along all the coordinate axes x, y and z and rotation of the stereoscreen around these axes at angles $\alpha_x$, $\beta_y$, and $\gamma_z$. The stereoscreen part of the $1_r$ is horizontally movable relative to the stereoscreen part $1_l$ and mounted on the auto-drive $2_r$ for displacement by means of this auto-drive in the limits of $\Delta x$ (in the plane of the stereoscreen) in synchronism with and parallel to the movements of the viewer's pupils of the eyes.

Figure 15:
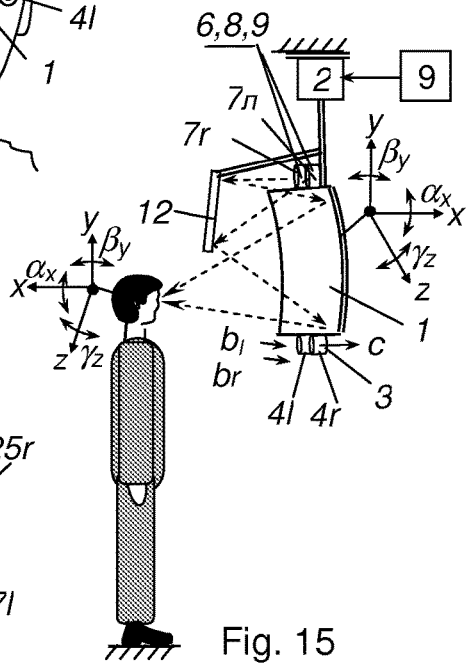
FIG. 15 shows design of a suspended stereoscopic projection system with movable reflecting spherical stereoscreen.

FIG. 15 shows a movable stereoscopic projection system mounted on the auto-drive 2. The auto-drive provides for movable suspension of the system on the ceiling with a possibility to move this system along all the coordinate axes x, y and z and rotate it by means of the auto-drive 2 of the stereoscreen 1 at angles $\alpha_x$, $\beta_y$, and $\gamma_y$, around these coordinate axes. The system ensures synchronized optimal positioning of the stereoscreen relative to the face of the viewer, who can move in an ample space under the ceiling (in the zone of the movement of the stereoscopic projection system by the auto-drive 2 connected with the auto-corrector 9).

The Stereoscopic Projection System Works as Follows:

The video cameras $4_l$ and $4_r$ of the tracking system 3 by means of the light beams $b_l$ and $b_r$ (reflected from the viewers' faces) perform continuous monitoring of position data of the eyes and pupils of the eyes of all the viewers (profile of eyes and pupils, eyebrows, nose, face, mouth). The tracking system processes these data following the loaded program and determines exact coordinates of the eyes and pupils of the eyes, forms control signals c for the auto-correctors and send these signals to the auto-corrector 10. The auto-collimator 6 scans with the light beam d the reference points of mirror of the stereoscreen 1 and changes deviations (from the programmed coordinate point of auto-correction) of center point of the sphere $M_s$ of the stereoscreen 1 or of centers of curvature of the mirror sections of the assembled stereoscreen. The auto-collimator 5 forms control signals for deviation of the sphere centers of the stereoscreen sent to the auto-corrector 10. The auto-corrector 10 receives the signals c from the tracking system 3 and the signals e from the auto-collimator 5 and forms the control signals f for the video corrector 11 and the control signals g sent to all the auto-drives 9 (9a, 9b, 9c, 9d, 9e, 9f, 9g) of the stereoprojectors 6. These auto-drives mechanically continuously and dynamically (in synchronism with changes of position data of the viewers; eyes, ocular convergence and ocular focal point) correct all movements along the coordinate axes and rotations around these coordinate axes of the stereoprojectors as well as auto-focusing of projection lenses in these units. The video corrector 11 in response to the signal f from the auto-corrector forms the control signals h for programmed video corrections of the stereopair frame images (formed in the projection units 8 of the stereoprojectors). The electronic and optical video correction corrects: displacements of the frame centers by optimal stereobases for harmonizing of horizontal parallaxes with the stereobase, ocular convergence and ocular focal points, elimination of vertical parallaxes, correction of geometrical distortions and scales of the projected stereopair frames for compensation of mirror curvature of the stereoscreen and provision of convergence of the conjugate points coinciding with the viewer's ocular focal point. This provides full control stereoviewing at various angles of observing of the screen stereoimages with account of the ocular convergence angles and changes of ocular focal points. For enabling viewers with eyesight defects (in case of different linear ocular magnification and different dioptries for different eyes of the viewer) to observe stereoimages without dioptrical glasses an individual auto-correction program for the auto-corrector and video correction of auto-focusing of the projection lenses $7_l$ and $7r$ can be chosen by the viewer. In case of closed eyes or glasses parameters of the eyes and for auto-correction are determined automatically by the tracking system performing monitoring of parameters of face profile, eyes, eyebrows, nose and mouth of each viewer with account of dioptries of the glasses and eyesight defects (input by the viewer for individual correction). For programming of such auto-correction the viewer preliminary takes off his glasses before the viewing for the tracking system to register eyes coordinates relative to continuously monitored face elements (eyebrows, nose or mouth or light points on the headphones).

In yet another embodiment of the stereoprojector shown on the FIG. 9 (View D) the display $7_l$, $7_r$ forms thin non-dispersing projection beams by pixels (video apertures or pixel micromirror—video reflector) $26_l$ and $26_r$. Coordinates, displacement in the plane of display $25a$ and $25b$ and size of these pixels form video signal of the video corrector 11 in response to the signal from the tracking system 3 monitoring eye pupils coordinates. In case of quick movements of the viewer's head and eyes simultaneous auto-correction is ensured (by the auto-correctors $9c$, $9d$ and $9e$ by the signals g) for coarse inertial displacement of the projectors $25_l$ and $25_r$ and electronic and optical video correction by the video corrector $11a$ for dynamic inertia free precise video displacements of these video apertures or video reflectors $27_l$ and $27r$ for instantaneous and precise alignment of the point focal zones of stereopair vision with corresponding centers of eye pupils. For this purpose the reflecting spherical stereoscreen must be placed closer to the viewer's eyes at a distance of 20-1000 mm, have precise mirror sphere and be precisely positioned in the system for ensuring precise programmed alignment with calculated center point of the stereoscreen sphere. Viewing of projection precisely focused on the viewer's pupil of the eyes provides better stereoeffect than binocular viewing of real object (with light beam dispersing by the eye pupil width). Free ocular accommodation (focusing) is ensured and viewing of deeper stereoeffect and more stereo planes than for observing of real objects. This allows for the viewer light adjustment of ocular focusing for optimal convergence corresponding observing of real objects. Such optical system provides maximal and full comfort of stereoviewing without limitation of viewing duration. For short-sighted or long-sighted viewers the system ensures full visual comfort without dioptricalal glasses. Additional effect—maximal design simplicity of the stereoscopic projection system without projection lenses (causing problems of aberration and glare). Such stereoscopic projection systems can be very small in size (with stereoprojectors volume less than 0.01 dm³), with minimal weight of 15 g, with low-inertial precise auto-drives of the stereoprojectors and optical elements of the stereo projection system and with minimal power consumption. This increases portability of the stereoscopic projection system with maximum and full comfort of stereovision (owing to overlarge stereovision field, invisibility of the stereoscreen plane and comfort ocular accommodation for far planes behind the stereoscreen with clear viewing of stereoeffect behind the screen). Such stereoscopic projection system can be used in the form of stereoscopic glasses shown on the FIGS. 12 and 13 or head mounted devices shown on the FIGS. 14 and 15. The system ensures auto-correction or video correction of these in case of displacements of the stereoscreen and/or the viewer's pupils of the eyes as in the stereoscopic projection systems shown on the FIG. 1 (taking into account modifications of the programs and design elements of a stereoscopic projection system for one stereoprojector and one viewer). These embodiments can provide the largest field of vision with horizontal angles up to 140° and vertical angles up to 100° (or for the entire zone seen by the two eyes). Stereoviewing is possible both with and without dioptricalal glasses. Design and location of the stereoscreens are optimal for the moving viewers (during the work, going or in the transportation means); for this purpose the stereoscreen must be located above the horizon level in all the vision zone. Below the horizon level a transparent zone remains allowing observing of the surrounding objects and space.

What is claimed is:

1. A stereoscopic projection system for glasses-free viewing of horizontal stereo pairs images on a screen comprising:
   a reflecting and focusing stereoscreen,
   a stereoprojector comprising a projection unit for forming stereo-pair frames, and a projection lens for the projecting stereo-pair frames onto the stereoscreen, thereby forming the stereo pair images;
   a tracking system for monitoring of the eyes and the pupils of the eyes of the viewer, and
   a video corrector
   wherein the tracking system is connected with the video corrector and adapted to perform a continuous monitoring of position data of the eyes of the viewer to determine exact coordinates of the eyes and pupils of the eyes for determining the viewers' ocular convergence and fixation point in their visual field, and
   wherein the video corrector is connected with the projection unit and capable of correcting displacements of frame centers of the projected stereopair frame images by optimal stereobases for harmonizing of horizontal parallaxes with the fixation point and viewer's ocular convergence.

2. A stereoscopic projection system as defined in claim 1, further comprising an auto-corrector connected with the tracking system for dynamic automatic displacements by auto-drives of optical systems of projection magnification for auto-focusing with consideration of the viewers' ocular convergence and fixation point.

3. A stereoscopic projection system as defined in claim 1, further comprising an auto-corrector connected with the tracking system for dynamic automatic displacements of the stereoprojector by auto-drives along any coordinate axis of three-dimensional space and/or rotation by the auto-drives around these axes,
   wherein displacements by the auto-drives of projection lenses of a stereoscopic lens assembly or of the optical systems of projection magnification by a calculated stereobase width are for auto-focusing or aperture adjustment or for convergence of the projection optical axes with consideration of the viewers' ocular convergence and fixation point, and
   wherein the video corrector is connected with the tracking system through the auto-corrector.

4. A stereoscopic projection system as defined in claim 1, wherein the projection unit comprises:
   movable matrices or movable projection units for forming and optimal orientation of frames of the projected stereopair relative to projection lenses; and
   auto-drives for displacement of the matrices along their vertical and horizontal axes, for rotation of the matrices around their vertical axes or displacement of the projection units with reflecting screens inside the stereoprojector around their vertical axes, and for auto-focusing of these projection units inside the stereoprojector.

5. A stereoscopic projection system as defined in claim 1, wherein the stereoscreen is flat with micromirror raster focusing stereoprojections in the fixation point in the viewer's visual field of the eye pupils, wherein projectors of the left and right eyes are located closer to the stereoscreen edge, for displacement of one fixation point stereovision zone for different stereobases and ocular convergence, wherein the stereoscreen includes a first screen part movable relative to a second screen part, wherein the left zone projector for the left frame of the stereopair is fastened on the first screen part, and the right zone-projector for the right frame of the stereopair is fastened on the second screen part, wherein the first and second parts are mounted on auto-drives connected with the auto-correctors for movements along the coordinate axes and rotation of the stereoscreen around these axes, and wherein the first screen part of the stereoscreen is mounted on the auto-drive with an auto-corrector of the horizontal displacement of the first screen part of the screen for dynamic alignment of the focal zones of left and right frames of the stereopair with the pupils of the corresponding eyes.

\* \* \* \* \*